United States Patent [19]
Welmer

[11] Patent Number: 4,980,912
[45] Date of Patent: Dec. 25, 1990

[54] PUBLIC COMMUNICATION SYSTEM COMPRISING DISTRIBUTED STATIONS, AND STATION AND SUB-STATION FOR USE IN SUCH A COMMUNICATION SYSTEM

[75] Inventor: Harm J. Welmer, Eindhoven, Netherlands

[73] Assignee: U. S. Philips Corporation, New York, N.Y.

[21] Appl. No.: 474,966

[22] Filed: Feb. 1, 1990

[30] Foreign Application Priority Data

Feb. 8, 1989 [NL] Netherlands ............ 8900307

[51] Int. Cl.$^5$ ............................................. H04K 1/00
[52] U.S. Cl. ..................................... 380/10; 380/16; 380/21
[58] Field of Search .............................. 380/10, 16, 21

[56] References Cited

U.S. PATENT DOCUMENTS

| 4,322,745 | 3/1982 | Saeki et al. | 380/10 |
| 4,528,589 | 7/1985 | Block et al. | 380/10 |
| 4,628,359 | 12/1986 | Okada et al. | 380/10 |
| 4,633,309 | 12/1986 | Li et al. | 380/10 |
| 4,751,732 | 6/1988 | Kamitake | 380/14 |
| 4,827,509 | 5/1989 | Izumiyama | 380/10 |
| 4,890,320 | 12/1989 | Monslow et al. | 380/10 |

OTHER PUBLICATIONS

S. M. Edwardson, "Scrambling and Encryption for Direct Broadcasting by Satellite", International Conference on Secure Communication Systems, Feb. 22–23, 1989, pp. 71–78.

Primary Examiner—Thomas H. Tarcza
Assistant Examiner—David Cain
Attorney, Agent, or Firm—Jack D. Slobod

[57] ABSTRACT

A public communication system for encrypted audio/video information has various selective entitlement organizations with respect to its distributed receiver station. Such receiver station comprises one or more receiver sub-stations for decrypting the received encrypted information by means of a decrypting key. Furthermore, the receiver station comprises one or more decription key sub-stations that may be interrogated by the receiver sub-stations and thereupon may verify a conditional access requirement, and in case of positive verification, forward decryption key information the interogating received sub-station. All said sub-stations are interconnected by a serial standard bus, so that the configuration of a station is flexible and may even be altered dynamically.

7 Claims, 2 Drawing Sheets

PUBLIC COMMUNICATION SYSTEM COMPRISING DISTRIBUTED STATIONS, AND STATION AND SUB-STATION FOR USE IN SUCH A COMMUNICATION SYSTEM

BACKGROUND OF THE INVENTION

The invention relates to a public communication system with distributed stations, comprising a broadcast sub-system for broadcasting encrypted audio and/or video information, a governing accounting system for distributing entitlements to the distributed stations and, in each station, a selectively activatable decryption sub-system which is verifiable by entitlement information in order to receive the encrypted information and to supply it to a reproduction apparatus after decryption. The foregoing may be realized as a system for pay television; payment can take place either by subscription or on the basis of the actual use of the programs supplied. The entitlements can be distributed in various ways, for example via a telephone link, in cooperation with information from the encrypted audio/video signal or not, by way of a system utilizing so-called chip cards, or by way of a coin box included in each station. It may be that access is granted to given persons and not to other persons, without payment taking place. In that case a chip card is a very suitable identification means. The broadcast medium may be the ether or a cable link organization. The signal source may be a transmitter or a reproduction apparatus which then involves a cable link. The invention can be used notably for consumer television but is not restricted thereto. It could as well be used for granting access to data bases which may be used by serial user stations simultaneously.

SUMMARY OF THE INVENTION

The system set forth operates simply if it involves only one accounting system which operates on a subscription basis. The inventor has anticipated the increasing complexity which may arise when a plurality of accounting systems operate in parallel, for example broadcasting systems which are based in different countries; in that case the entitlements may be realized on respective different various bases and the waveforms of the broadcast sub-system may be subject to different standards. It is inter alia an object of the invention to realize an effective organization in a receiver station in such a communication system in the event that the identity of the decryption sub-system is not unambiguously known in advance because of said divergences, so that various different decryption sub-systems could be represented in each station, thereby allowing as much flexibility in said representation, or alternatively, in the absence thereof in a particular station. According to one of the aspects of the invention, the object is realized in that the invention provides a public communication system, comprising a broadcast sub-system for broadcasting encrypted audio and/or video information, a plurality of distributed stations for decrypting of this information after reception and for making decrypted information available to a reproduction apparatus, and a governing accounting system/access control system for selectively making one or more decryption keys available to each station, a station comprising at least one decryption key sub-station (CASS) and at least one receiver sub-station, all such sub-stations within each station being interconnected by means of a standard serial bus without a central bus control sub-station, each receiver sub-station comprising means for receiving a current program selection from a user, storage means for identifying a selective accounting system/access control system thereby, and accessing means for via said serial bus accessing a decryption key sub-station associated with said selective accounting system/access control system, for thereby verifying an entitlement, for upon verification deriving a decryption key therefrom, and for enabling a further accessing operation in case of non-verification of said entitlement. The standard bus allows any station to have an arbitrary set of receiver sub-stations and decryption key sub-stations, which may be changed geometrically as far as the layout of the bus allows, and also allows for adding and/or deleting any number of sub-stations.

The invention also relates to a station for use in such a system, and also to a decryption key sub-station and a receiver sub-station for use in such a station. Various types of sub-stations may be easily connectable or disconnectable to the standard serial bus, which would also allow to have an aggregate of sub-stations of various different manufacturers smoothly cooperate.

Further attractive aspects of the invention are recited in dependent claims.

BRIEF DESCRIPTION OF THE FIGURES

The invention will be described in detail hereinafter with reference to several Figures.

SYSTEM DESCRIPTION

Figure 1:
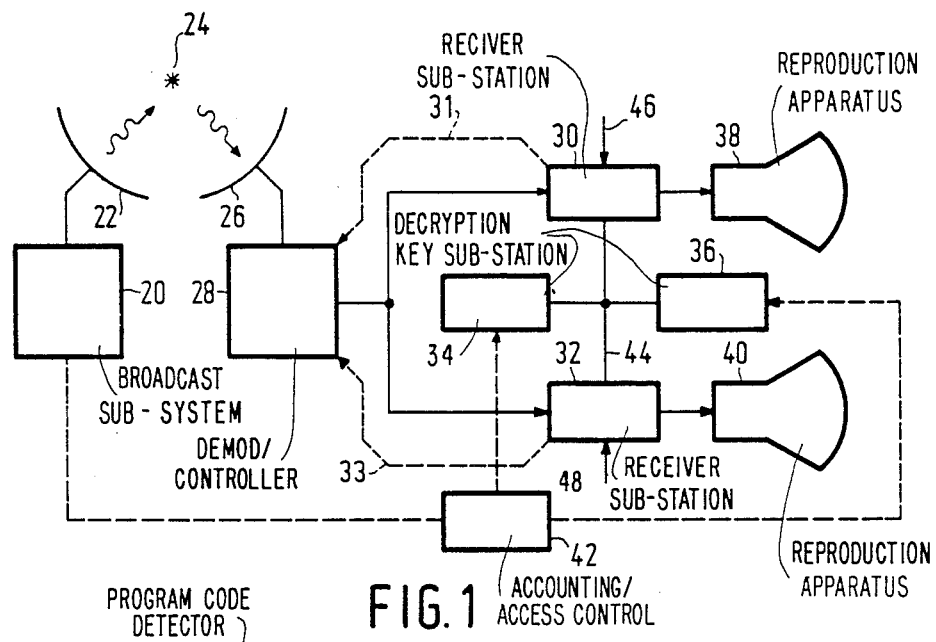
FIG. 1 shows a communication system in accordance with the invention.

FIG. 1 shows a public communication system in accordance with the invention. Block 20 represents a broadcasting sub-system which in this case feeds a parabolic antenna 22 for broadcasting audio and/or video information in the form of programs. This information is encrypted by means of a predetermined encryption key. This key, or at least the key which is required for decryption, is not generally known. The information reaches a satellite 24 in which it is amplified and retransmitted to a terrestrial parabolic antenna 26. Block 28 represents a demodulator/controller. This device amplifies the analog signals, performs FM demodulation, converts the demodulated signal into a bit stream and, controls the position of the antenna 26, if necessary, in response to signals on lines 31, 33 supplied respectively by receiver sub-stations 30, 32 when position control of antenna 26 is utilized. This bit stream is applied to the receiver sub-stations 30, 32. Therein the information received is decrypted by means of a decryption key for supply to reproduction apparatus 38, 40. Blocks 34, 36 represent decryption key sub-stations which make the decryption key available to receiver sub-stations 30, 32, subject to conditions yet to be described. This is realized by communication via the serial bus 44. Such a serial bus is described per se in U.S. Pat. No. 4,429,384 and is known as a $D^2B$ bus; the invention, however, is not restricted to the use of this bus. A special advantage of the $D^2B$ bus consists in the absence of any bus control sub-station. This means that inter alia, access requests by the several sub-stations can be generated in mutual independence. A particular advantage of $D^2B$ is that the bus protocol allows for various different transmission bit rates. The electrical standardization of D²B allows for many interconnected sub-systems that may be located at appreciable distances, such as would occur in a home or small office environment. Block 42 represents a governing accounting system/access control system of the kind set forth. In the decryption key sub-stations 34, 36 this system activates the decryption key associated with the encryption key used in the broadcasting sub-station. Activation in the sub-stations 34, 36 can be realized, for example via a telephone link via which key information is transmitted. Alternatively, this information is already present and a selection is made between a number of keys. It is also possible for a part of the key to be contained in the program information so that it forms the actual decryption key in conjunction with information from the accounting system. The receiver sub-stations 30, 32 comprise user activation inputs 46, 48 such as a keyboard or an infrared control element. Thus, a selection is possible between "off" and "on" and possibly a program selection can be made by a user (station selection, channel selection and the like). The elements 30, 32, 34, 36 and 38, 40 together constitute a station.

The system shown in FIG. 1 may also have a different construction; the number of accounting systems may be different (larger) and a plurality of receiver sub-stations may be connected to the same antenna; on the other hand, each receiver station may also comprise its own decryption key sub-station.

The accounting system may be based on the chip card principle; this card is introduced into the decryption key sub-station: the cards and the sub-station together contain sufficient information for decryption. The chip card may be organized according to the debit principle: the card is purchased by the consumer and represents a given value. Depending on the consumption of given program information, this value is gradually used up.

The audio/video signal (22, 24, 26) may also be fully or partly analog. In that case the analog signals are processed in the transmitter/receiver; however, the value or code of the decryption key is then stored in digital form in the decryption key sub-stations and communication takes place digitally. The transmission mechanism (22, 24, 26) may also be based on a cable organization or a local reproduction apparatus. This does not constitute an essential difference. In addition to said sub-stations, further sub-stations may be connected to the serial bus. This does not introduce an essential difference either. It may be that given information is encrypted (the programs) while other information is not (for example, commercials and program announcements or summaries of the programs).

Furthermore, organizationally, a particular decryption key sub-station may be assigned to one or more receiver sub-stations. Also, a particular receiver sub-station may have one or more decryption key sub-stations assigned to it. Also, the physical topology (as distinct from the logical topoloy) may be a single bus run, a plurality of runs that connect to a common junction, a closed loop-like run, or any other configuration according to needs and electrical realizeablility.

CHARACTERISTICS OF A RECEIVER SUB-STATION

Characteristics of a preferred embodiment of a receiver sub-station will be decribed in detail hereinafter, in combination with the previously described realization of a serial bus, i.e. the so-called D²B bus. The bit formats, the composition of the messages, the changing-over between modes at different bit rates, the organization at the level of absent/present acknowledge bits and the like will not be described for the sake of brevity. The following data is present in the receiver sub-station:

a. its own bus address; this is necessary because all bus messages contain the own address of the broadcast sub-station;

b. the permissible standards of the audio/video information. This information defines the basic types such as those according to PAL, NTSC, MAC-family, MUSE and the like. These standards are known per se and will not be described herein. Generally speaking, the receiver will accept one basic type at a given instant, but it is also possible to change the basic type in the case of a change-over from one program to another.

c. specific characteristic data concerning its own operation vis-à-vis said serial bus, such as a facility for acting as a master station, the intended bit rate and other feasible bit rates, and the amount of buffer space which is directly available for the storage of information.

d. the actually received or the basic type which can be directly received for the AV (audio/video) signal;

e. possibly a presence table for the decryption key sub-stations which are suitable for the respective basic types permissible in the receiver sub-station as regards the audio/video signals. The relevant decryption key sub-stations, therefore, can be addressed by the receiver sub-station concerned. Thus, for each decryption key sub-station such a table may contain:

a sequence number of the decryption key-sub-station in question a sub-station address basic type of the audio/video signal type of the conditional access to the audio/video signal, such as at the moment, for example NRMSK, Eurocript-NTA/Philips, Eurocypher, Eurocrypt-CCETT/CanalPlus, Filmnet (analog); with the type there are associated directly the encoding/encryption format, the key words, formulation/formating of the entitlement; the above types themselves are subject to standardization;

possibly CAS-accounting system; this provides the name of the relevant organization, such as "CanalPlus", "Scansat";

f. a table for storing the variables involved in the decryption process. In given cases a receiver sub-station is capable of performing a plurality of decryption processes simultaneously. Thus, for each type of code the table may contain:

a reference sequence number which can act so as to identify the decryption process (together with the bus address of the decryption key sub-station) using in the relevant key word; this sequence number may therefore, be included in the bus protocol;

a code which indicates which service or services as represented by the audio/video signal can be offered by the relevant process;

a code which indicates whether the relevant service is free of charge, i.e. freely accessible, or whether decryption must be performed by means of key information which is not available free of charge, and an indication of the decryption key or the whole decryption key or a part thereof, for use in the receiver sub-station;

a code which indicates that, even if the audio/video information is freely accessible, a decryption operation must still be performed;

the number of the relevant decryption key sub-station.

CHARACTERISTICS OF A DECRYPTION KEY SUB-STATION

Characteristics of a decryption key sub-station will be described in detail hereinafter. Generally speaking, a decryption key sub-station contains information associated with a fixed decryption mechanism (possibly a number of such mechanisms). The key itself, and also any accounting information, may of course be variable, for example in that a positive financial balance is successively depleted. The stationary information is the following:

the bus address of the serial bus in order to be addressable as a slave station or as the own address when it acts as a master station, and also mode information concerning the operation of the sub-station vis-à-vis the bus, such as the bit rate;

the basic type of the audio/video information, this is the signal or broadcast standard (PAL, NTSC, etc.) whereto the conditional access, entitlements, keys and the like relate;

the signal standard; this is the standard (PAL, NTSC . . . etc.) whereto the entitlements, keys and the like relate;

the type of conditional access for which the relevant decryption key sub-station is designed, for example the previously described set NRMSK, Eurocrypt-NTA/Philips, Eurocypher, Eurocrypt-CCETT-/CanalPlus, etc. In first instance a single decryption key sub-station will act on a single type of conditional access;

the name of the organization/agency which is the supplier of the information and/or distributes the entitlements in the system, for example CanalPlus, etc.;

a unique customer number which is used, for example for bookkeeping purposes.

A decryption key sub-station may be capable of performing various processes within a given signal standard, for example in that the key information is modified or chosen from a plurality of possibilities which are present continuously. The entitlements can be processed in accordance with predetermined specifications. For example, for each program an hourly fee can be defined; this fee can be preset arbitrarily from one program to another and/or from one organization to another.

APPLICATION PROTOCOL

An application protocol will be described hereinafter. Generally speaking, via the serial bus a dialog takes place between the receiver sub-station and the decryption key sub-station. Instructions, requests and acknowledgements or specifications can be communicated. The specifications may comprise zero, one, or more than one parameter.

The decryption key sub-station first makes itself known to all receiver sub-stations in the station, for example when the mains voltage is switched on. If this is accepted by a (the) receiver sub-station, it may request the decryption key sub-station to supply all relevant information (i.e. the contents necessary for filling the table in the receiver sub-station). When mains voltage is applied to a receiver sub-station, it interrogates all decryption key sub-stations in the station in order to fill its own table.

When a channel with conditional access is tuned to, the receiver sub-station selects the signal package "0". This is standardized in said signal standard. When the relevant channel involves conditional access which is applicable to the relevant service, this protection is activated so that one or more relevant key words must be provided. All decryption sub-stations which are compatible with the relevant signal standard and the conditional access involved, are then interrogated so as to determine whether they may provide any further key words. If this is so, the decryption key sub-station concerned receives the parameters of the relevant service. The decryption key sub-station supplies the key information to the receiver sub-station in the case of usability of this service. If applicable, the most ready decryption key sub-station is selected. The receiver station then receives the relevant key. When a decryption key sub-station does not have relevant key information available when interrogated, its response is negative and, if possible, another decryption key sub-station is interrogated. When all decryption key sub-stations associated with the relevant standard give a negative response, no entitlement can be verified, for example in that a given period of time has expired or in that a positive account now has been used up. In that case the receiver sub-station concerned detects that all decryption key sub-stations have given a negative response and outputs an error message in a suitable manner, for example a visual signal on a LED, or a message from the reproduction apparatus. This aspect will not be described for the sake of brevity.

If information concerning entitlements is received via the audio/video channel (i.e. via block 28 in FIG. 1), this information is are also checked first by means of the decryption key sub-stations which are loaded, if necessary, or the admission of a given group of customers is updated. To this end, therefore, the decryption key sub-stations for the relevant signal standard and the type of conditional access must be searched for. It is again possible that the interrogated stations are absent or already fully occupied, or alternatively, that the information regarding the conditional access is not required. In case of a non-executable function met, a diversion is made either to a function which can still be activated or, if this is also impossible, the system supplies an error message.

DESCRIPTION OF TWO SUB-STATIONS

Figure 2:
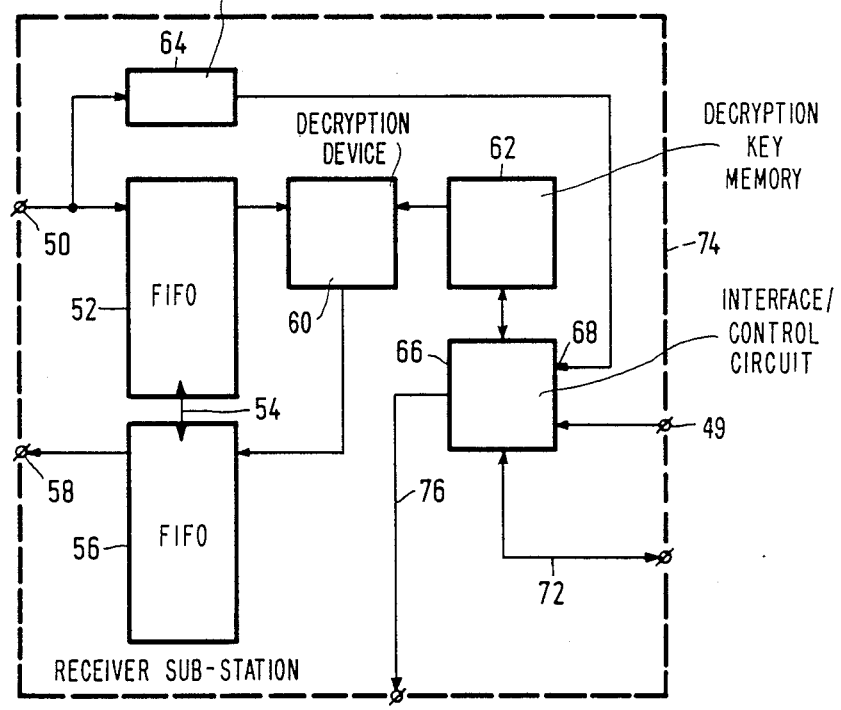
FIG. 2 shows a receiver sub-station for use in a station in accordance with the invention.

FIG. 2 shows a receiver sub-station 74 for use in a station in accordance with the invention. The information which has not yet been decrypted arrives on input 50; in the present case this information is assumed to be digital information. Element 64 is a detector for specific, non-encrypted codes which indicate the beginning and the end of a program, and also, for example for a code which identifies the relevant program (for example, in order to obtain commercial retrocoupling) and a statement of the fee which is to be paid out of a possible balance receivable in the decryption key sub-station. It may be that the same code is periodically included in the program (for example, 1× per second, possibly together with progressive updating of the payments to be made; this signal arrives on input 68 of the bus interface circuit cum control circuit 66. Furthermore, there is provided an input 49 for the reception of program selection signals, for example a frequency channel. If necessary, these signals are processed so as to form a control signal on line 76 for block 28 in FIG. 1 (see the broken lines 31, 33). The orientation of the parabolic antenna 26, the frequency tuning, the modulation and the like can thus be readjusted. Alternatively, the signal on the line 49 is associatively processed so that an optimum choice is pursued in block 28, for example the strongest transmitter for a given channel identification. Under the control of the code on the line 68 (which may generate an interrupt), the circuit 66 checks whether the information indicated by the code corresponds to the decryption procedures followed in the receiver sub-station. Initially this will not be the case and the presence table for the decryption key sub-stations will be consulted. The desired decryption key sub-station is then activated, via the bus 72, in order to supply the key information as has already been stated. The key information received is stored in a memory 62 which communicates directly with the special decryption device 60. This device receives the decrypted information from the input 50 via a first-in first-out memory 52. In element 60 decryption is performed in a known manner by means of a filter. Decryption operations are known per se; for brevity they will not be described. After decryption the information words are stored in the first-in-first-out buffer 56 after which they are applied to the relevant reproduction apparatus via output 58. Arrow 54 indicates that the two first-in-first-out buffers are coupled; thus, the streams on the lines 50 and 58 are synchronous; the operation in the element 60 need not be fully synchronized therewith. Block 66, or block 62, comprises the memory for storing said tables. The organization within the receiver station is symbolically represented; the organization at the circuit level may be different. Depending on the required complexity, the respective functions can be performed by more complex or by simpler components. All internal communication can take place via a bus or via dedicated connections as shown.

Figure 3:
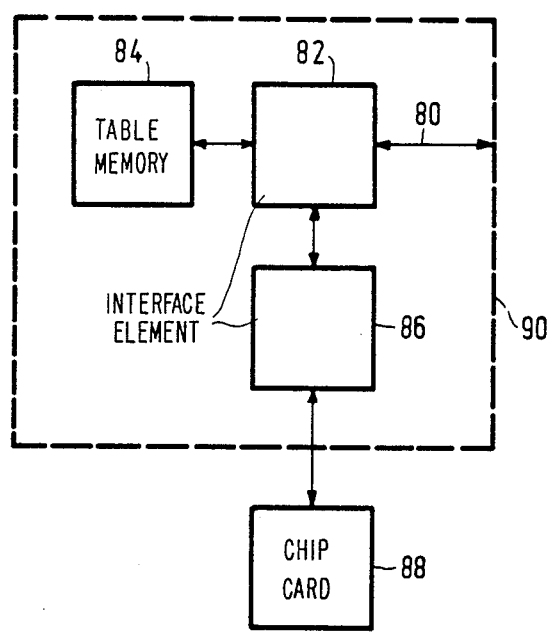
FIG. 3 shows an decryption key sub-station for use in a station in accordance with the invention.

FIG. 3 shows a decryption key sub-station for use in a station in accordance with the invention. The sub-station 90 comprises an interface element 82 to the serial bus 80 which also provides central control for the sub-station. There is also provided a memory 84 which serves inter alia for the storage of the described table information. There is also provided an interface element 86 to a chip card 88 which can be introduced into the decryption key sub-station in order to present the entitlement information. In this case the decryption key sub-station can act as a slave if the entitlements interrogation by the receiver sub-station occurs sufficiently frequently. In other cases the decryption key sub-station can also act as a master station, for example for indicating that the chip card has been introduced or removed, or for indicating that the decryption key sub-station has been activated or deactivated in another manner.

I claim:

1. A system for broadcasting encrypted information, comprising a plurality of distributed stations for reception and decrypting of this information and for making decrypted information available to a reproduction apparatus, and a governing accounting system/access control system for selectively making one or more decryption keys available to each station, each station comprising at least one decryption key sub-station (CASS) and at least one receiver sub-station, all such sub-stations within each station being interconnected by means of a standard serial bus without a central bus control sub-station, each receiver sub-station comprising means for receiving a current program selection from a user, storage means for identifying a selective accounting system/access control system thereby, and accessing means for via said serial bus accessing a decryption key sub-station associated with said selective accounting system/access control system, for thereby verifying an entitlement, for upon verification deriving a decryption key therefrom, and for enabling a further accessing operation in case of non-verification of said entitlement.

2. In a system for broadcasting encrypted information among distributed stations, a station comprising at least one receiver sub-station and at least one decryption key sub-station, all such sub-stations being interconnected by means of a serial bus without a central bus control sub-station, each receiver sub-station comprising means for receiving a current program selection from a user, storage means for storing a local bus address, a list of audio/video information standards to be received, and characteristic data concerning the operation of the receiver sub-station vis-a-vis the serial bus, and means for identifying, by way of the program selection received, an associated selective accounting system/access control system, for then accessing an associated decryption key sub-station, for thereby verifying an entitlement, and for upon verification deriving a decryption key from said decryption key sub-station, and for enabling a further accessing operation in case of non-verification of said entitlement.

3. In a system for broadcasting encrypted information among distributed stations, a station comprising at least one receiver sub-station and at least one decryption key sub-station, all such sub-stations being interconnected by means of a serial bus with distributed bus control means, each receiver sub-station comprising receiving means for receiving a current program selection information from a user, identification means for under control of said program selection information identifying an associated decryption key sub-station and thereupon accessing the latter sub-station via said serial bus, the latter sub-station having verification means for under control of said access verifying an entitlement information with respect to the program so selected, and forwarding means for under control of a positive verification forwarding means for under control of a positive verification forwarding an entitlement information for the program so selected via said serial bus to the accessing receiver sub-station.

4. A station as claimed in claim 3, wherein said entitlement information forwarded to said receiving sub-station comprises decryption key information.

5. A station as claimed in claim 2, 3 or 4, wherein said serial bus is a D²B bus.

6. A station as claimed in any of claims 2 to 4, wherein each receiver sub-station further comprises means for receiving encypted information inclusive of non-encrypted identification information identifying a particular conditional access type as regards said encrypted information, detecting means for detecting said identification information, bus interface means to a standard serial bus for under control of said detecting means putting an access request for a decryption key sub-station associated to said conditional decryption key sub-station receiving either decryption key information, or alternatively a refusal information.

7. A station as claimed in any of claims 2 to 4, wherein said decryption key sub-station comprises means for storing an entitlement information, bidirectional bus interface means to a distributed-control standard serial bus for receiving an entitlement interrogation signal and for transmitting an entitlement verification signal, and verification means for under control of said entitlement interrogation signal, selectively in case of a verified entitlement, generating said entitlement verification signal onto said serial bus.

* * * * *